US009036969B2

(12) United States Patent
Kwon et al.

(10) Patent No.: US 9,036,969 B2
(45) Date of Patent: May 19, 2015

(54) SPOT SIZE CONVERTERS AND METHODS OF MANUFACTURING THE SAME

(75) Inventors: Oh Kee Kwon, Daejeon (KR); Chul-Wook Lee, Daejeon (KR); Dong-Hun Lee, Daejeon (KR); Young Ahn Leem, Daejeon (KR); Young-Tak Han, Daejeon (KR); Yongsoon Baek, Daejeon (KR); Yun C. Chung, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 327 days.

(21) Appl. No.: 13/618,353

(22) Filed: Sep. 14, 2012

(65) Prior Publication Data
US 2013/0266263 A1    Oct. 10, 2013

(30) Foreign Application Priority Data

Apr. 4, 2012    (KR) ..................... 10-2012-0035014

(51) Int. Cl.
*G02B 6/26*    (2006.01)
*C03B 37/022*    (2006.01)
*G02B 6/122*    (2006.01)
*G02B 6/30*    (2006.01)

(52) U.S. Cl.
CPC ............. *G02B 6/1228* (2013.01); *G02B 6/305* (2013.01)

(58) Field of Classification Search
USPC ......................................................... 385/43
See application file for complete search history.

(56) References Cited

U.S. PATENT DOCUMENTS

| 6,396,984 B1 * | 5/2002 | Cho et al. .................. 385/43 |
| 6,571,039 B1 * | 5/2003 | Al-hemyari et al. ............ 385/43 |
| 6,631,225 B2 | 10/2003 | Lee et al. |
| 8,837,884 B2 * | 9/2014 | Suzuki et al. ................... 385/43 |
| 2009/0297093 A1 * | 12/2009 | Webster et al. ................. 385/14 |
| 2011/0205660 A1 * | 8/2011 | Komura et al. ................. 360/59 |

FOREIGN PATENT DOCUMENTS

KR    10-0429912    4/2004

OTHER PUBLICATIONS

H. Bissessur, et al., "Ridge laser with spot-size converter in single epitaxial step for High Coupling Efficiency to Single-Mode Fibers", IEEE Photonics Technology Letters, vol. 10, No. 9, pp. 1235-1237, Sep. 1998.

Marko Galarza et al., "A New spot-size converter concept using fiber matched antiresonnat reflecting optical waveguides", Journal of Lightwave Technology, vol. 21, No. 1, pp. 269-274, Jan. 2003.

(Continued)

*Primary Examiner* — Hemang Sanghavi
(74) *Attorney, Agent, or Firm* — Rabin & Berdo, P.C.

(57) ABSTRACT

Provided are a spot size converter and a method of manufacturing the spot size converter. The method includes stacking a lower clad layer, a core layer, and a first upper clad layer on a substrate, tapering the first upper clad layer and the core layer in a first direction on a side of the substrate, forming a waveguide layer on the first upper clad layer and the lower clad layer, and etching the waveguide layer, the first upper clad layer, the core layer, and the lower clad layer such that the waveguide layer is wider than a tapered portion of the core layer on the side of the substrate and has the same width as that of the core layer on another side of the substrate.

13 Claims, 18 Drawing Sheets

(56) References Cited

OTHER PUBLICATIONS

Vinod M. Menon, et al., "Photonic integration using asymmetric twin-waveguide (ATG) technology", IEEE Journal of Selected Topics in Quantum Electronics, vol. 11, No. 1, pp. 30-42, Jan./Feb. 2005.

Oh Kee Kwon, et al., "Operational properties of ridge waveguide lasers with laterally tapered waveguides for Monolithic Integration", ETRI Journal, vol. 29, No. 6, pp. 811-813, Dec. 2007.

M. Kohtoku, et al., "Spot size converters integrated with deep ridge waveguide structure", Electronics Letters vol. 34, No. 25, pp. 2403-2404, Dec. 1998.

* cited by examiner (FWHM(x)=27.297 deg, FWHM(y)=39.0932 deg)

(FWHM(x)=12.1414 deg, FWHM(y)=14.9851 deg)

SPOT SIZE CONVERTERS AND METHODS OF MANUFACTURING THE SAME

CROSS-REFERENCE TO RELATED APPLICATIONS

This U.S. non-provisional patent application claims priority under 35 U.S.C. §119 of Korean Patent Application No. 10-2012-0035014, filed on Apr. 4, 2012, the entire contents of which are hereby incorporated by reference.

BACKGROUND OF THE INVENTION

The present invention disclosed herein relates to an optical device and a method of manufacturing the optical device, and more particularly, to a spot size converter appropriate for monolithic integration of an optical device, and a method of manufacturing the spot size converter.

Recent semiconductor optical devices are designed and manufactured based on the concept of a ridge waveguide (RWG) in order to improve high speed operation, simplicity of fabrication, and monolithic integration. For example, active devices such as laser diodes and optical amplifiers may have a shallow RWG structure by etching only an upper clad layer except for an active region. Passive devices such as optical waveguides, modulators, and phase controllers may have a deep RWG structure by performing an etching process to under an active region. The shallow RWG structure and the deep RWG structure can be efficiently and monolithically integrated by adjusting the width of a deep ridge waveguide.

In general, a guided mode of a semiconductor optical device having a shallow ridge waveguide may have an oval shape or a hat shape. Since such a guided mode has a far-field pattern (FFP) with a vertical full-width at half maximum (FWHM) different from a horizontal FWHM, when a semiconductor optical device having the guide mode is coupled to a typical optical fiber or a specific optical fiber, optical coupling loss is increased.

Since an FFP of a typical semiconductor optical device having a deep ridge waveguide has a FWHM greater than that of an optical device including an optical fiber or a silica waveguide, when the semiconductor optical device is coupled to the optical device including an optical fiber or a silica waveguide, optical coupling loss is also increased.

Thus, optical coupling efficiency between a ridge waveguide type semiconductor optical device and a device such as an optical fiber, a silica waveguide, or a polymer waveguide can be improved by varying an FWHM of an FFP of the ridge waveguide type semiconductor optical device. To this end, a semiconductor optical device may perform a spot size conversion through mode conversion and transfer by means of a core layer of a shallow ridge waveguide type laser diode, and a waveguide separately disposed under the core layer. However, even though the width of a shallow ridge waveguide is decreased, since variation in effective refractive index of a guided mode is not large, mode conversion efficiency is not high. To address this issue, the width of a ridge waveguide and the thickness of a clad layer disposed on an active layer may be gradually decreased to decrease the effective refractive index of the active layer, or a ridge waveguide may be disposed near a different type of ridge waveguide to perform a mode conversion. However, the gradual decrease of the thickness of a clad layer, and the configuration of different types of ridge waveguides complicate manufacturing processes, thus decreasing productivity.

SUMMARY OF THE INVENTION

The present invention provides a spot size converter having a simple structure, and a method of manufacturing the spot size converter.

The present invention also provides a spot size converter capable of maximizing productivity, and a method of manufacturing the spot size converter.

Embodiments of the present invention provide methods of manufacturing a spot size converter, including: stacking a lower clad layer, a core layer, and a first upper clad layer on a substrate; tapering the first upper clad layer and the core layer in a first direction on a side of the substrate; forming a waveguide layer on the first upper clad layer and the lower clad layer; and etching the waveguide layer, the first upper clad layer, the core layer, and the lower clad layer such that the waveguide layer is wider than a tapered portion of the core layer on the side of the substrate and has the same width as that of the core layer on another side of the substrate.

In some embodiments, the waveguide layer may be tapered on the first side of the substrate in a second direction opposite to the first direction.

In other embodiments, the methods may further include forming a buffer layer on the lower clad layer after the core layer and the first upper clad layer are formed, wherein the buffer layer is formed of the same material as that of the first upper clad layer.

In still other embodiments, the methods may further include forming an etch stop layer on the buffer layer and the first upper clad layer.

In even other embodiments, the methods may further include forming a second upper clad layer on the waveguide layer.

In yet other embodiments, the methods may further include forming a planarization layer on side walls of the waveguide layer, the first upper clad layer, the core layer, and the lower clad layer.

In other embodiments of the present invention, spot size converters include: a substrate; a first waveguide including a core layer that is tapered in a first direction on a side of the substrate and that is extended with a uniform width on another side thereof; and a second waveguide including a waveguide layer that covers the first waveguide on the first side of the substrate, that is tapered and extended in a second direction opposite to the first direction, and that has the same width of that of the core layer on the second side of the substrate.

In some embodiments, the first waveguide may further include a lower clad layer disposed under the core layer, and a first upper clad layer disposed over the core layer.

In other embodiments, the spot size converters may further include a buffer layer disposed on the lower clad layer and side walls of the first upper clad layer and the core layer, at the first side of the substrate.

In still other embodiments, the spot size converters may further include an etch stop layer disposed on the buffer layer and the first upper clad layer.

In even other embodiments, the second waveguide as a passive waveguide may further include a second upper clad layer disposed on the waveguide layer.

BRIEF DESCRIPTION OF THE DRAWINGS

The accompanying drawings are included to provide a further understanding of the present invention, and are incorporated in and constitute a part of this specification. The drawings illustrate exemplary embodiments of the present invention and, together with the description, serve to explain principles of the present invention. In the drawings.

DETAILED DESCRIPTION OF PREFERRED EMBODIMENTS

Figure 1:
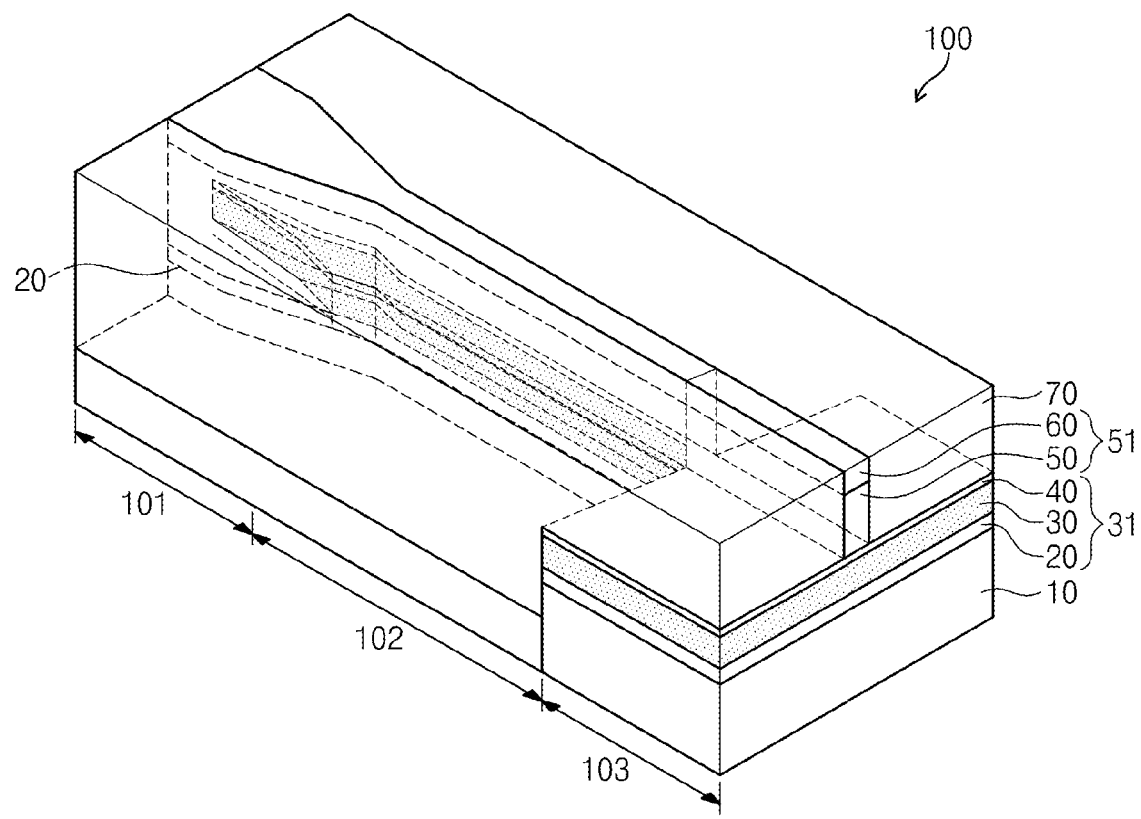
FIG. 1 is a perspective view illustrating a spot size converter according to an embodiment of the present invention.

Hereinafter, embodiments of the present invention will be described in detail with reference to the accompanying drawings. The present invention will be clarified through the following embodiments described with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Like reference numerals refer to like elements throughout.

In the following description, the technical terms are used only for explaining exemplary embodiments while not limiting the present invention. The terms of a singular form may include plural forms unless referred to the contrary. The meaning of 'comprises' and/or 'comprising' specifies a property, a region, a fixed number, a step, a process, an element and/or a component, but does not exclude other properties, regions, fixed numbers, steps, processes, elements and/or components. Since exemplary embodiments are provided below, the order of the reference numerals is not limited to the order of the descriptions. In the specification, it will be understood that when a layer is referred to as being 'on' another layer or substrate, it can be directly on the layer or substrate, or intervening layers may also be present.

Figure 2:
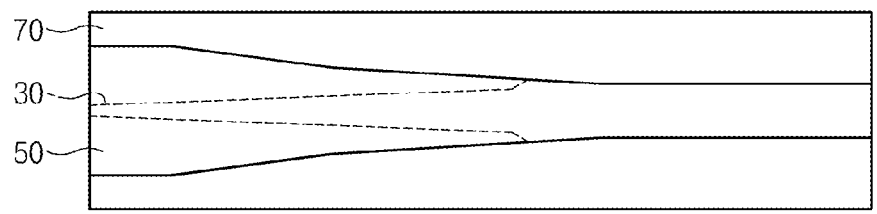
FIG. 2 is a plan view illustrating the spot size converter of FIG. 1.

FIG. 1 is a perspective view illustrating a spot size converter 100 according to an embodiment of the present invention. FIG. 2 is a plan view illustrating the spot size converter 100.

Referring to FIGS. 1 and 2, the spot size converter 100 may include: a core layer 30 tapered in a first direction; and a waveguide layer 50 covering the core layer 30 on a side of a substrate 10, and tapered in a second direction opposite to the first direction. The core layer 30 and the waveguide layer 50 may extend with the same width on another side of the substrate 10. The core layer 30 and the waveguide layer 50 may have a simple structure of a deep ridge waveguide.

Accordingly, since the spot size converter 100 has a simple structure in which a mode conversion occurs within the core layer 30, the productivity thereof can be maximized.

The substrate 10 may include GaAs or InP. A first waveguide 31 may extend with the same width as that of the substrate 10, and be parallel thereto. The first waveguide 31 may include the core layer 30, a lower clad layer 20 disposed under the core layer 30, and a first upper clad layer 40 disposed over the core layer 30. The lower clad layer 20 may include InP, AlGaAs, or InGaP. The core layer 30 may include InGaAsP, InGaAlAs, AlGaAs, GaAs, or InGaAs, which has a higher refractivity index than that of the lower clad layer 20. The first upper clad layer 40 may include InP, AlGaAs, or InGaP.

A second waveguide 51 may cover the first waveguide 31. The second waveguide 51 may include the waveguide layer 50 and a second upper clad layer 60. At the first side of the substrate 10, the waveguide layer 50 may cover upper portions of the core layer 30 and the lower clad layer 20, and side walls thereof. The waveguide layer 50 may include InP, AlGaAs, or InGaP. The second upper clad layer 60 may include a material having a refractive index that is equal to or lower than that of the waveguide layer 50, or may include InGaAs or GaAs for a laser operation.

A planarization layer 70 may cover side walls of the second waveguide 51 and the first waveguide 31. The planarization layer 70 may include a polymer such as polyimide or benzocyclobutene (BCB).

In a mode conversion region 101, the first waveguide 31 and the second waveguide 51 are tapered. In the mode conversion region 101, side walls of the first waveguide 31 and the second waveguide 51 may be embedded in the planarization layer 70. The second waveguide 51 may straightly extend at the outside of the mode conversion region 101. In this case, the planarization layer 70 may define the first and second waveguides 31 and 51 in a deep ridge waveguide region 102 and a shallow ridge waveguide region 103. In the deep ridge waveguide region 102, side walls of the first and second waveguides 31 and 51 may be embedded in the planarization layer 70. In the shallow ridge waveguide region 103, the planarization layer 70 may be disposed on the first waveguide 31, and side walls of the second waveguide 51 may be embedded in the planarization layer 70. The first waveguide 31 may support the planarization layer 70 in the shallow ridge waveguide region 103. The boundary between the deep ridge waveguide region 102 and the shallow ridge waveguide region 103 may be inclined at about 7 to 20 degrees from the first and second waveguides 31 and 51.

An optical spot size conversion may depend on the width of the core layer 30 and the width of a deep ridge thereof. The full-width at half maximum (FWHM) of a spot size may be varied according to sizes of the core layer 30 and the waveguide layer 50 on the first side of the substrate 10.

For example, the core layer 30 may have a thickness of about 0.32 μm for an output beam having an operating wave-length of about 1.3 µm. On the first side of the substrate 10, the core layer 30 may have a width of about 0.5 µm, and the waveguide layer 50 may have a width of about 10 µm. On the second side of the substrate 10, the core layer 30 and the waveguide layer 50 may have a width of about 3 µm. In this case, the core layer 30 and the waveguide layer 50 may be tapered in opposite directions within a length ranging from about 120 µm to about 250 µm.

Figure 3A:
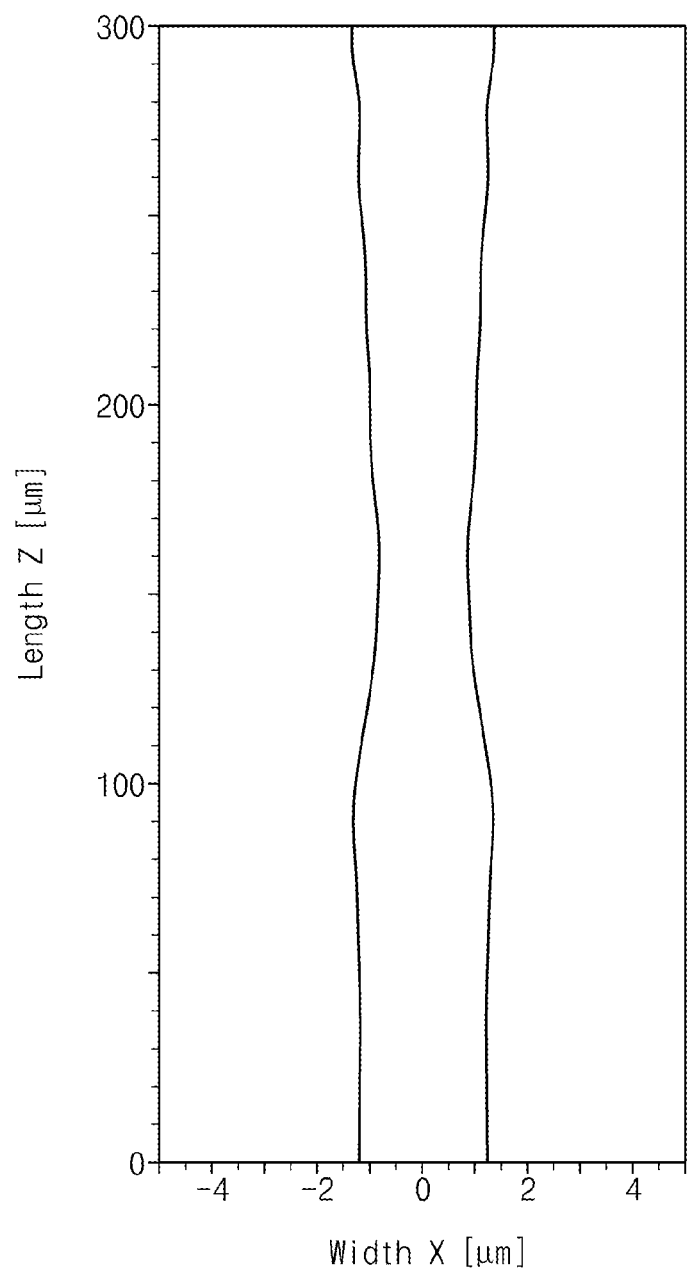
FIG. 3A is a graph illustrating a far-field pattern (FFP) from a core layer to a waveguide layer, calculated using a beam propagation method according to another embodiment of the present invention.
Figure 3B:
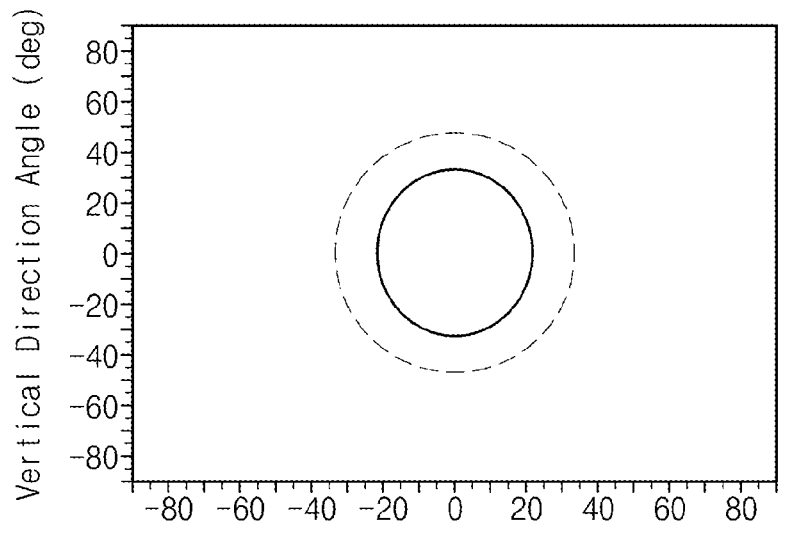
FIG. 3B is a graph illustrating an FFP of an input beam incident to the core layer of FIG. 3A.
Figure 3C:
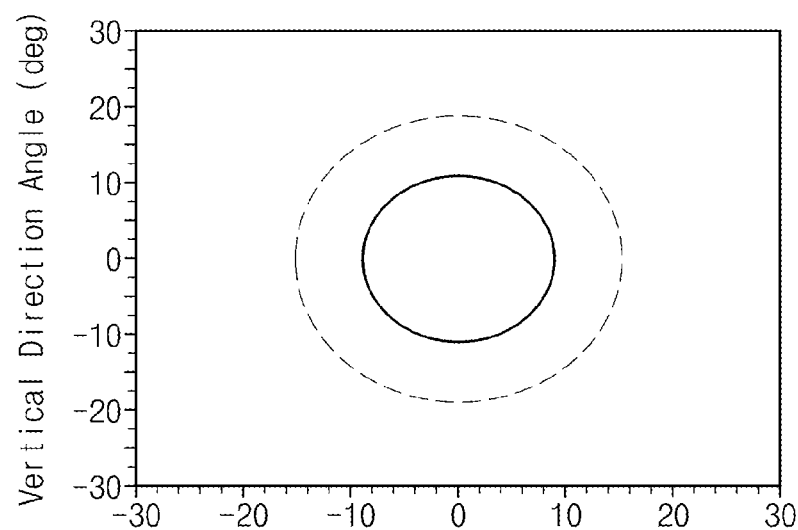
FIG. 3C is a graph illustrating an FFP of an output beam to the waveguide layer of FIG. 3A.

FIG. 3A is a graph illustrating a far-field pattern (FFP) from the core layer 30 to the waveguide layer 50, calculated using a beam propagation method (BPM). FIG. 3B is a graph illustrating an FFP of an input beam incident to the core layer 30. FIG. 3C is a graph illustrating an FFP of an output beam to the waveguide layer 50.

Referring to FIGS. 3A to 3C, the spot size converter 100 can obtain an output beam having an FFP with a smaller full-width at half maximum (FWHM) than that of an input beam. For example, an FFP of an input beam may have a full-width at half maximum of about 27.3 degrees×39.1 degrees. In this case, an FFP of an output beam may have a full-width at half maximum of about 12.1 degrees×15 degrees, which is smaller than that of the input beam. The horizontal axis of FIG. 3A denotes width of the core layer 30 and the waveguide layer 50, and the vertical axis thereof denotes length of the core layer 30 and the waveguide layer 50. The horizontal axes of FIGS. 3B and 3C denote horizontal direction angle in the core layer 30 and the waveguide layer 50, and the vertical axes thereof denote vertical direction angle in the core layer 30 and the waveguide layer 50. An FFP of an output beam provided by the core layer 30 and the waveguide layer 50 is significantly superior to that of a typical deep ridge structure corresponding to 30 degrees.

Thus, the spot size converter 100 can minimize optical coupling loss.

Figure 4:
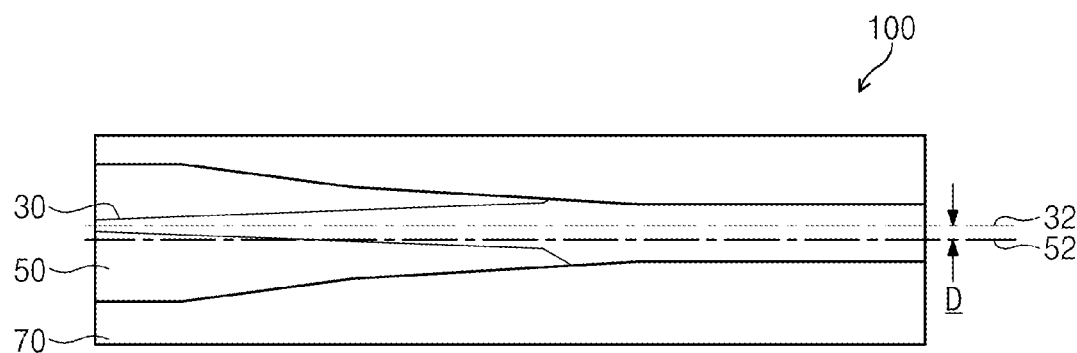
FIG. 4 is a plan view illustrating a state that a core layer is mismatched with a waveguide layer according to another embodiment of the present invention.
Figure 5:
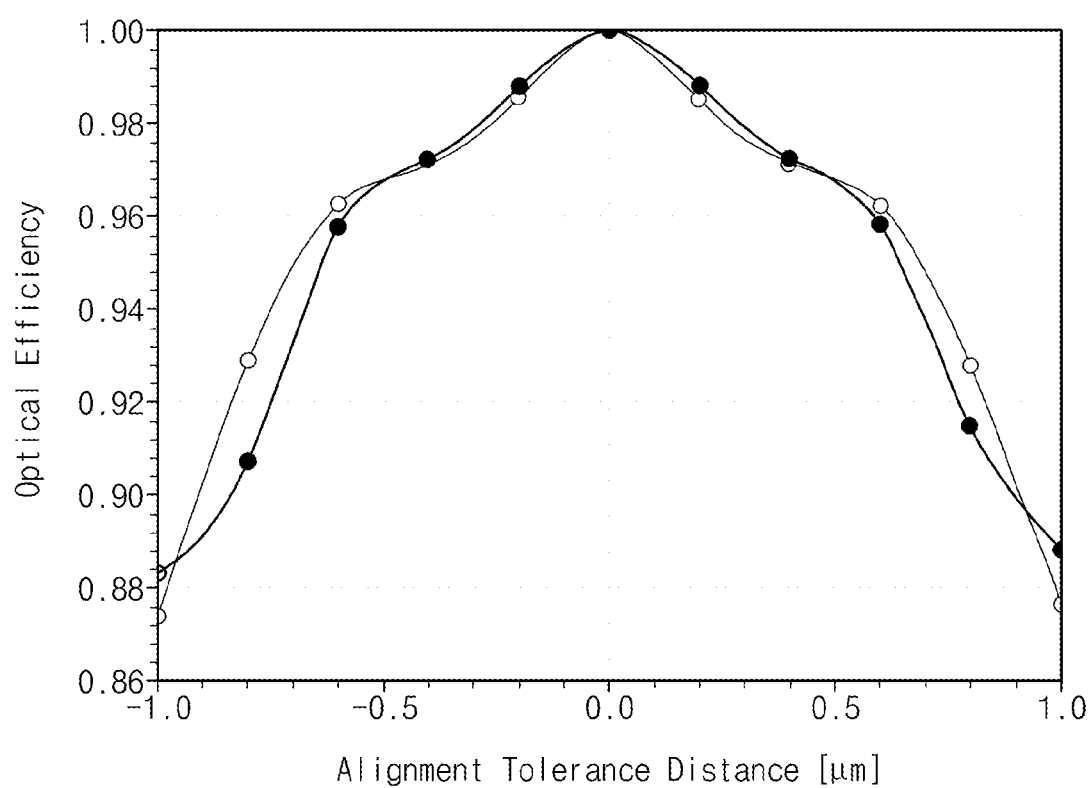
FIG. 5 is a graph illustrating efficiency of output beams according to an alignment tolerance distance D according to another embodiment of the present invention.

FIG. 4 is a plan view illustrating a state that the core layer 30 is mismatched with the waveguide layer 50. FIG. 5 is a graph illustrating efficiency of output beams according to an alignment tolerance distance D when the core layer 30 has minimum widths of about 0.1 µm and about 0.2 µm.

Referring to FIGS. 4 and 5, even though the core layer 30 is mismatched with the waveguide layer 50, the efficiency of the output beams is high. For example, when the alignment tolerance distance D is about ±1 µm, an output beam provided by the core layer 30 and the waveguide layer 50 may have an efficiency of about 88%. The horizontal axis of FIG. 5 denotes the alignment tolerance distance D, and the vertical axis thereof denotes normalized efficiency of an output beam with respect to the maximum efficiency determined when the alignment tolerance distance D is zero. The alignment tolerance distance D may be defined as a distance between a first center line 32 of the core layer 30 and a second center line 52 of the waveguide layer 50. As described above, even though the core layer 30 is mismatched with the waveguide layer 50, the efficiency of an output beam is high.

Thus, the productivity of the spot size converter 100 can be maximized.

Figure 6:
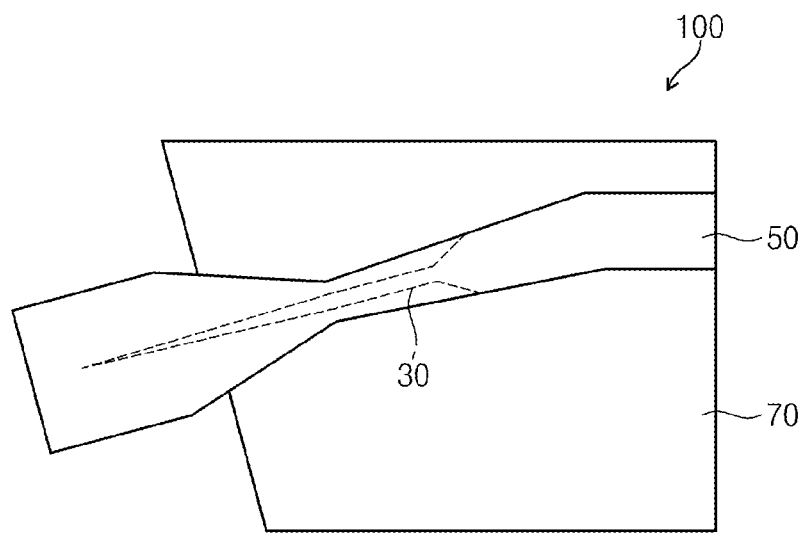
FIG. 6 is a plan view illustrating a spot size converter according to another embodiment of the present invention.

FIG. 6 is a plan view illustrating a spot size converter 100 according to another embodiment of the present invention.

Referring to FIG. 6, the spot size converter 100 according to the current embodiment may include a core layer 30 and a waveguide layer 50, which are tilted. The waveguide layer 50 may be exposed at a side of a substrate (refer to reference numeral 10 of FIG. 1). A planarization layer 70 may cover side walls of the core layer 30 and the waveguide layer 50 on another side of the substrate. The core layer 30 and the waveguide layer 50 may be tapered in opposite directions on the first side of the substrate. The core layer 30 and the waveguide layer 50 may be bent on the second side of the substrate.

Accordingly, since the spot size converter 100 according to the current embodiment has a simple structure, the productivity thereof can be maximized.

A method of manufacturing the spot size converter 100 according to the previous embodiments will now be described.

FIGS. 7A, 8A, 9A, and 10A are plan views illustrating a method of manufacturing the spot size converter 100 according to the embodiment of FIG. 1. FIGS. 7B, 8B, 9B, and 10B are cross-sectional views taken along line I-I' of FIGS. 7A, 8A, 9A, and 10A, respectively. FIGS. 7C, 8C, 9C, and 10C are cross-sectional views taken along line II-II' of FIGS. 7A, 8A, 9A, and 10A, respectively.

Figure 7A:
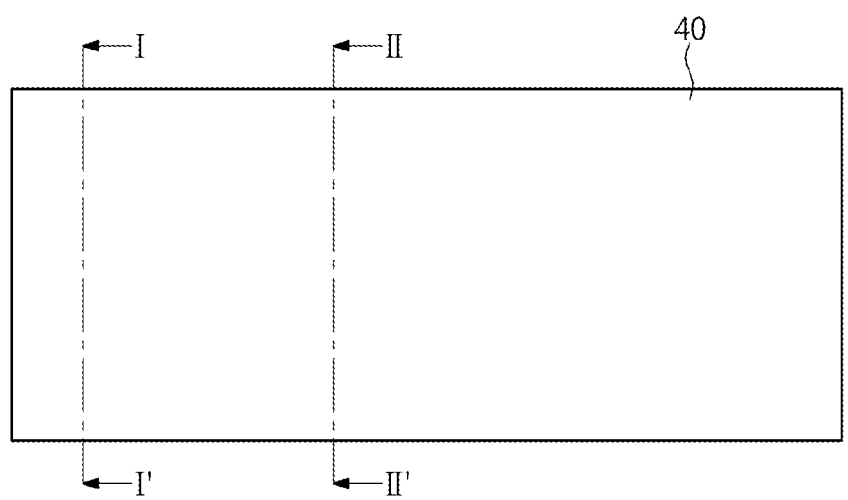
FIGS. 7A, 8A, 9A, and 10A are plan views illustrating a method of manufacturing the spot size converter according to the embodiment of FIG. 1.
Figure 7B:
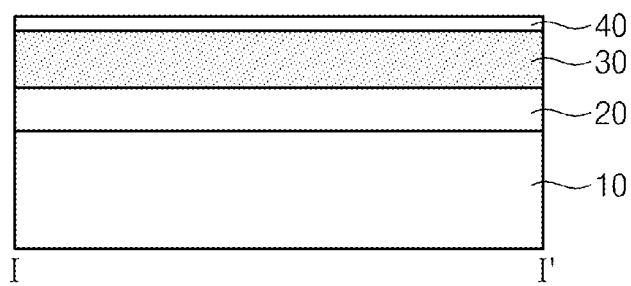
FIGS. 7B, 8B, 9B, and 10B are cross-sectional views taken along line I-I' of FIGS. 7A, 8A, 9A, and 10A, respectively.
Figure 7C:
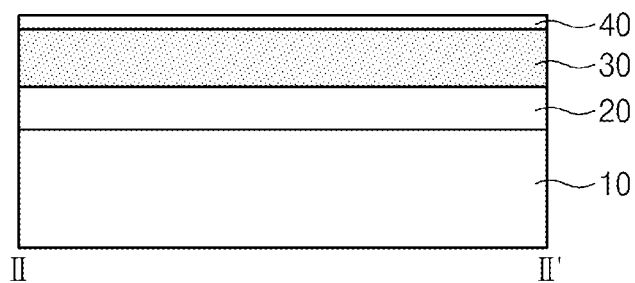
FIGS. 7C, 8C, 9C, and 10C are cross-sectional views taken along line II-II' of FIGS. 7A, 8A, 9A, and 10A, respectively.

Referring to FIGS. 7A to 7C, the lower clad layer 20, the core layer 30, and the first upper clad layer 40 are formed on the substrate 10. The lower clad layer 20, the core layer 30, and the first upper clad layer 40 may include InP, InGa(Al)As(P), and InP, respectively, or AlGaAs, (In)GaAs, and AlGaAs, respectively, through a process such as metal-organic chemical vapor deposition (MOCVD) or molecular beam epitaxy (MBE). The lower clad layer 20 and the first upper clad layer 40 may be doped with p type or n type impurities.

Figure 8A:
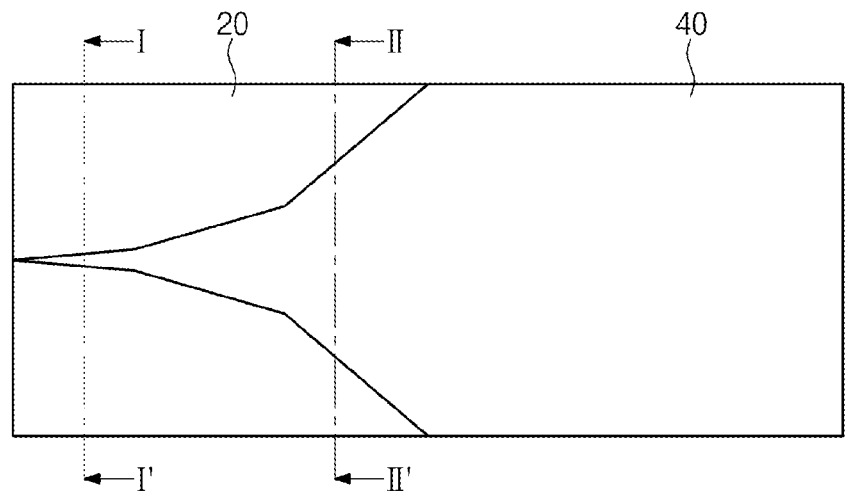
Figure 8B:
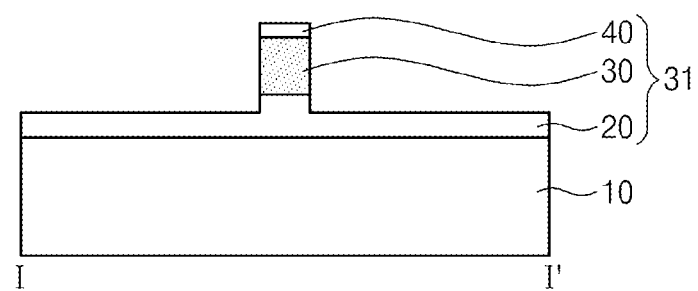
Figure 8C:
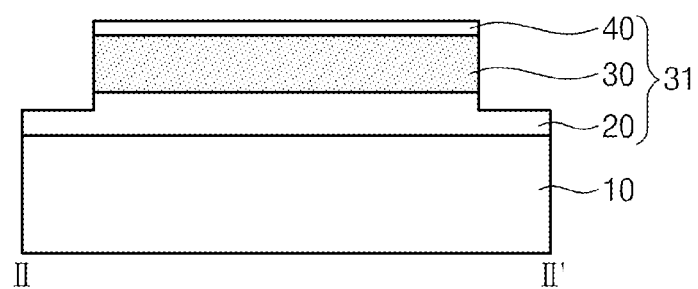

Referring to FIGS. 8A to 8C, the portions of the first upper clad layer 40 and the core layer 30 on the first side of the substrate 10 are tapered through patterning. The first upper clad layer 40 and the core layer 30 may be patterned through a photolithography process and an etching process. A photoresist pattern (not shown) may be formed on the first upper clad layer 40 through the photolithography process. The first upper clad layer 40 and the core layer 30 may be pattered through the etching process using the photoresist pattern as an etching mask. At this point, a portion of the lower clad layer 20 under the core layer 30 may be removed through the etching process.

After the etching process, the first upper clad layer 40 and the core layer 30 may have a width of about 0.5 µm or smaller on the first side of the substrate 10. The lower clad layer 20, the core layer 30, and the first upper clad layer 40 may constitute the first waveguide 31.

Figure 9A:
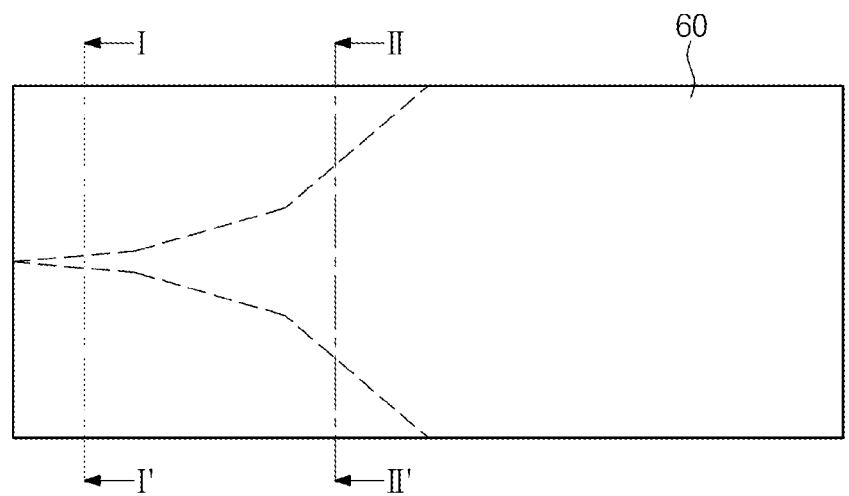
Figure 9B:
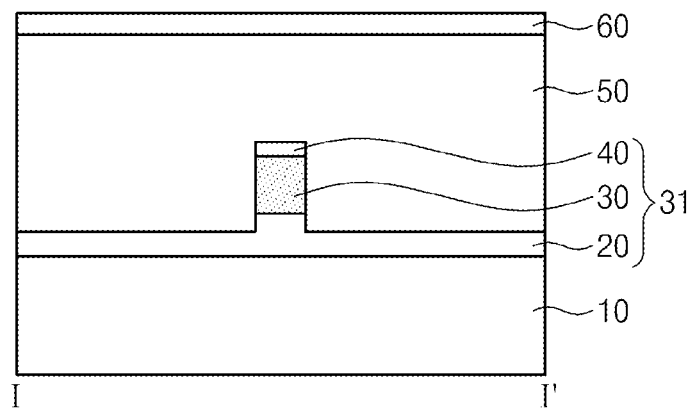
Figure 9C:
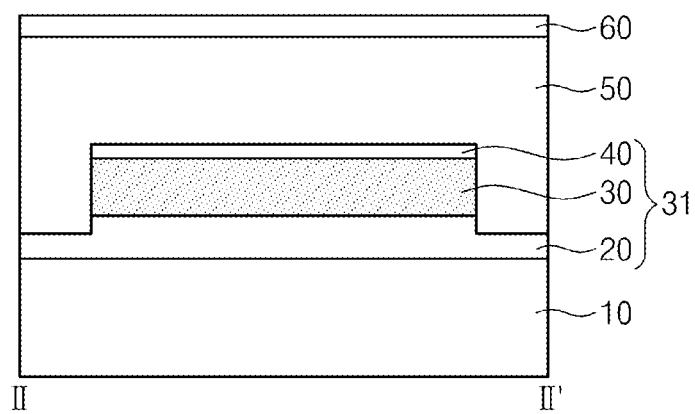

Referring to FIGS. 9A to 9C, the waveguide layer 50 and the second upper clad layer 60 are formed on the lower clad layer 20 and the first upper clad layer 40. The waveguide layer 50 and the second upper clad layer 60 may include InGaAsP and (p-)InP, respectively, through a process such as molecular beam epitaxy (MBE) or metal organic chemical vapor deposition (MOCVD). The waveguide layer 50 may have a thickness of about 30 µm, and the second upper clad layer 60 may have a thickness of about 1.9 µm.

Figure 10A:
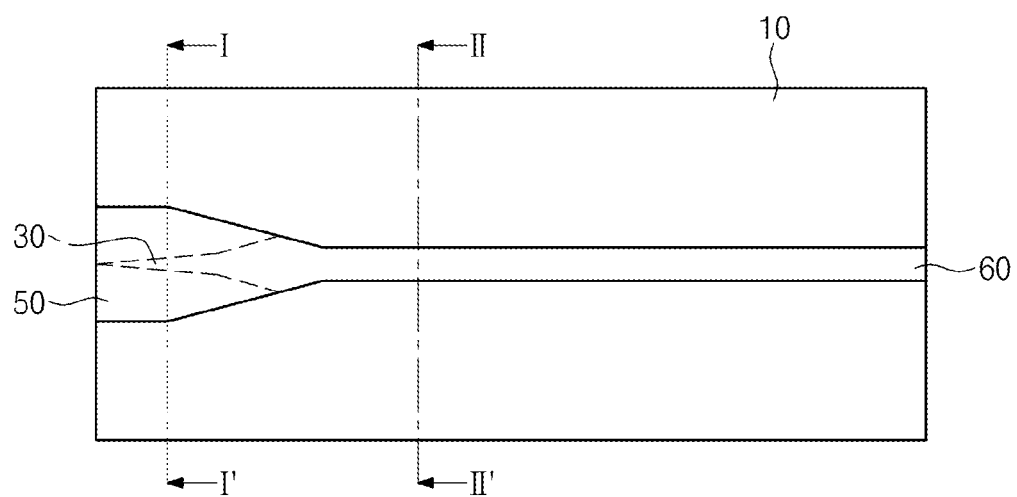
Figure 10B:
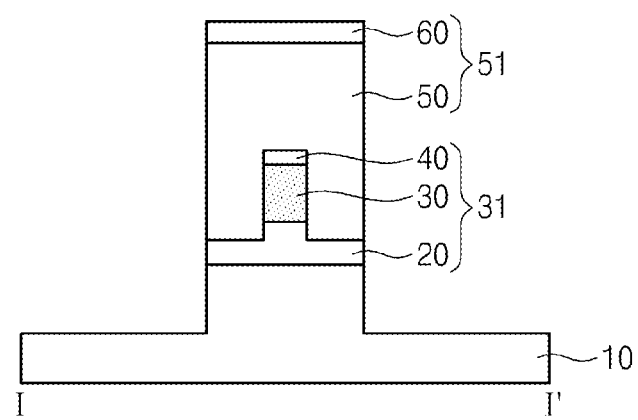
Figure 10C:
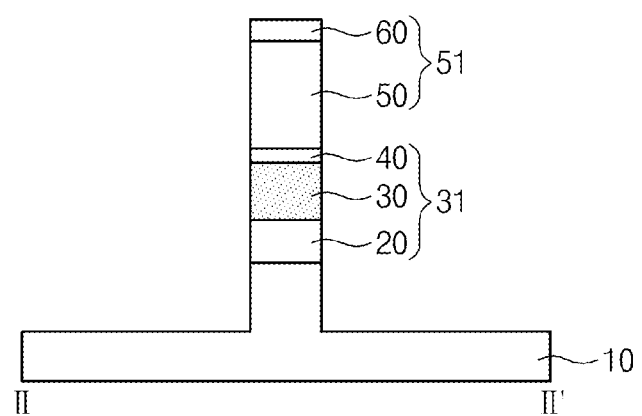

Referring to FIGS. 10A to 10C, the waveguide layer 50 is wider than the core layer 30 on the first side of the substrate 10, and the waveguide layer 50 and the core layer 30 have the same width on the second side of the substrate 10. To this end, a region from the second upper clad layer 60 to the lower clad layer 20 is etched. The region from the second upper clad layer 60 to the lower clad layer 20 may be patterned through a photolithography process and an etching process. When the lower clad layer 20 is etched, the top surface of the substrate 10 may be removed. At this point, the core layer 30 of the second waveguide 51 may be patterned through a growth process and an etching process, and the waveguide layer 50 may be patterned on the core layer 30 through a re-growth process and an etching process.

Thus, the method of manufacturing the spot size converter 100 according to the embodiment of FIG. 1 can maximize the productivity of the spot size converter 100. The second upper clad layer 60 and the waveguide layer 50 may constitute the second waveguide 51 as a passive wave guide. The first waveguide 31 and the second waveguide 51 as a passive waveguide may have a deep ridge waveguide structure on the first side of the substrate 10.

Referring again to FIG. 1, the planarization layer 70 is formed on side walls of the second waveguide 51 and the first waveguide 31. The planarization layer 70 may include a polymer formed through heat treatment. As described above, the core layer 30 and the waveguide layer 50 can be efficiently formed through respective growth processes and respective etching process.

As a result, the method of manufacturing the spot size converter 100 according to the embodiment of FIG. 1 can maximize the productivity of the spot size converter 100.

Figure 11:
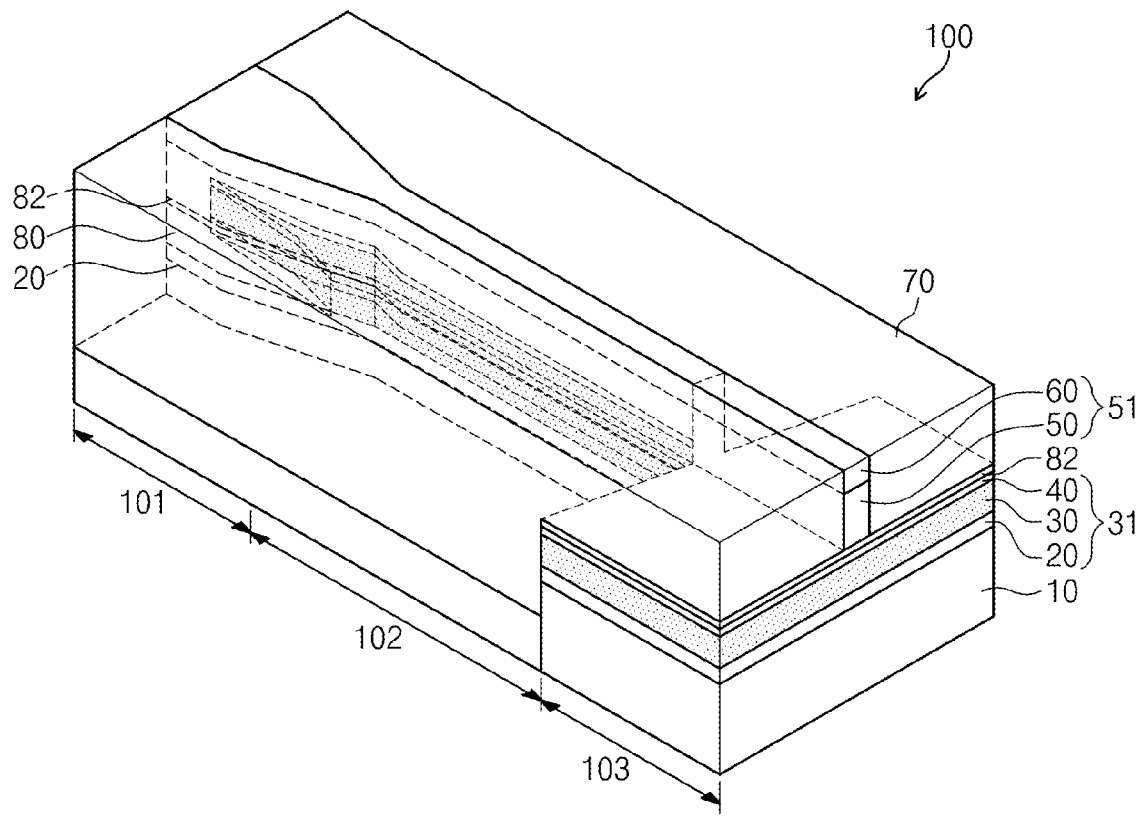
FIG. 11 is a perspective view illustrating a spot size converter according to another embodiment of the present invention.
Figure 12A:
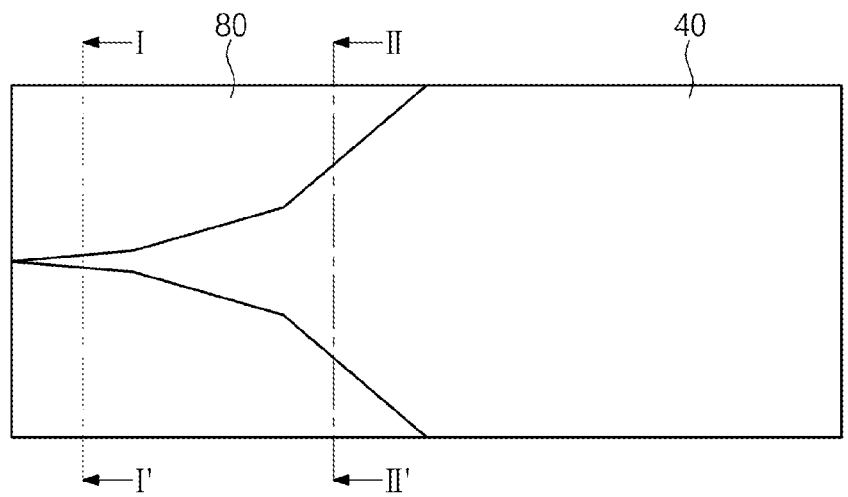
FIGS. 12A, 13A, and 14A are plan views illustrating a method of manufacturing the spot size converter of FIG. 11.
Figure 12B:
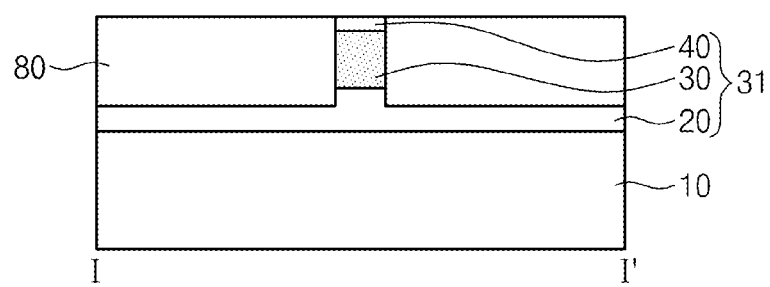
FIGS. 12B, 13B, and 14B are cross-sectional views taken along line I-I' of FIGS. 12A, 13A, and 14A, respectively.
Figure 12C:
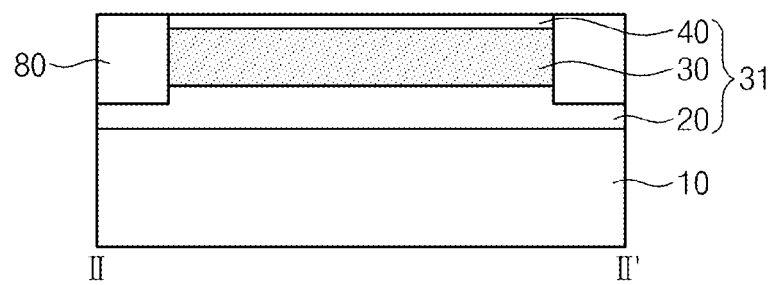
FIGS. 12C, 13C, and 14C are cross-sectional views taken along line II-II' of FIGS. 12A, 13A, and 14A, respectively.
Figure 13A:
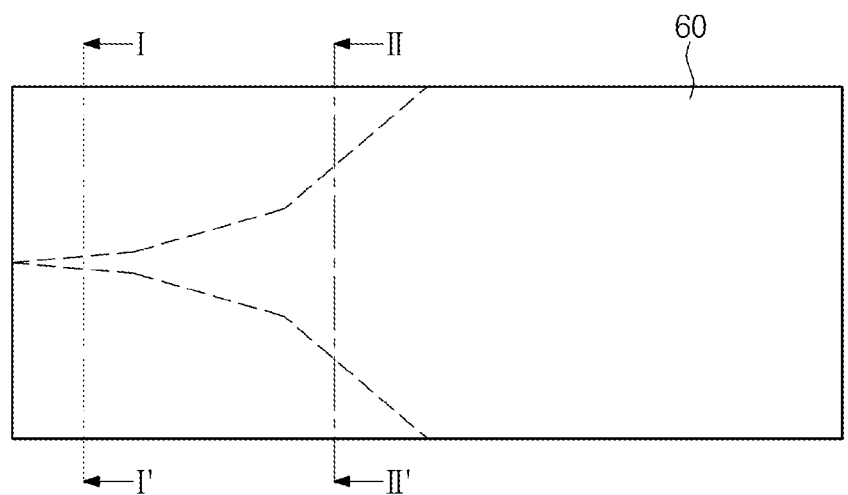
Figure 13B:
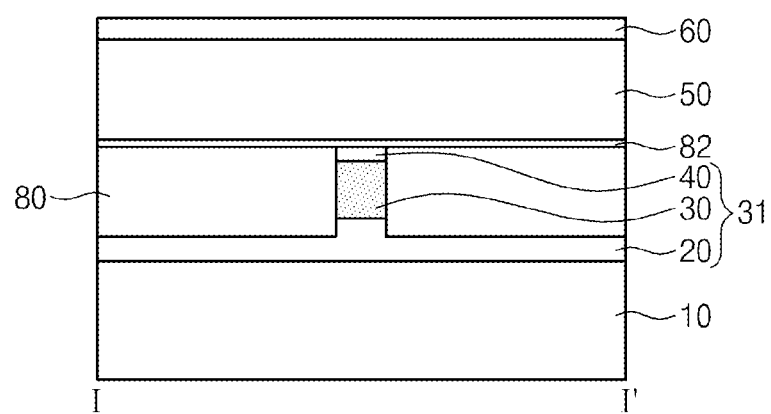
Figure 13C:
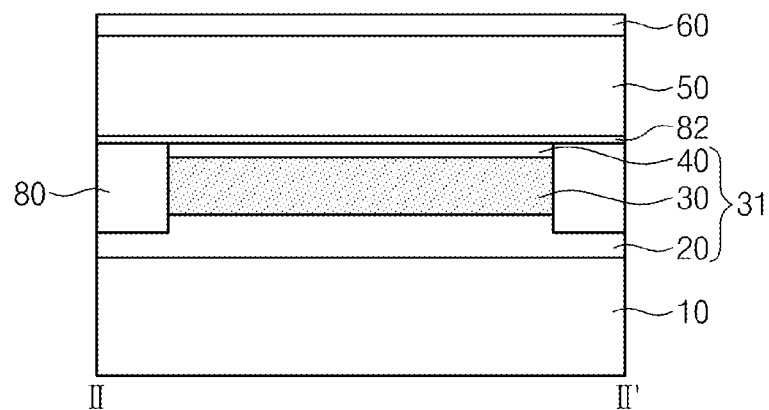
Figure 14A:
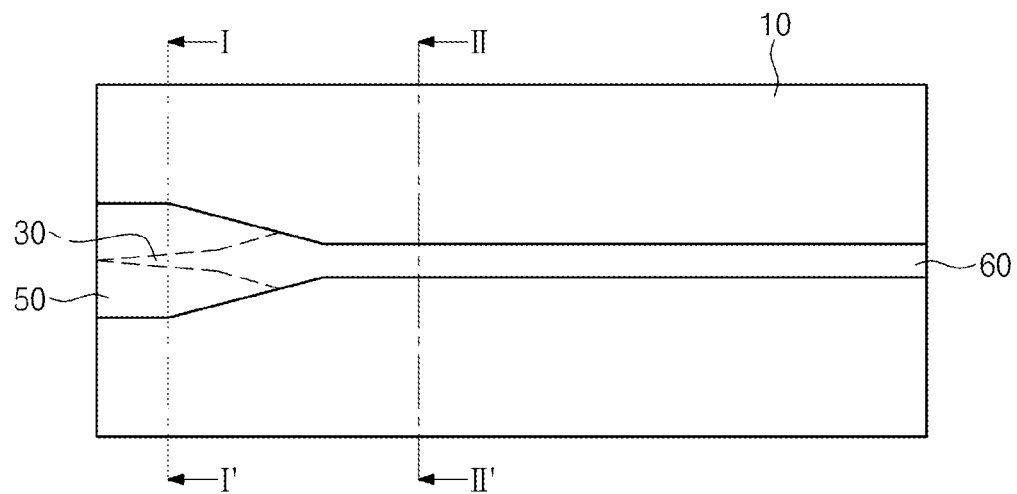
Figure 14B:
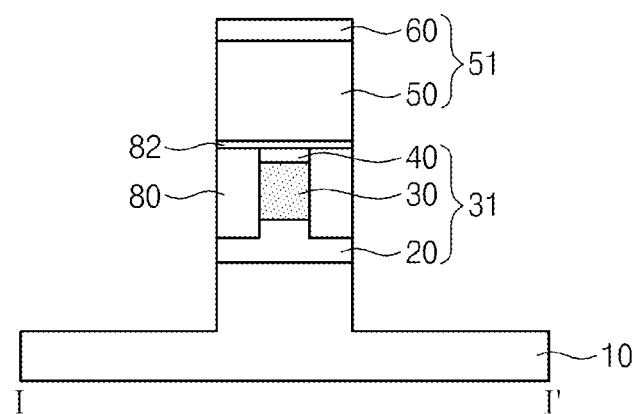
Figure 14C:
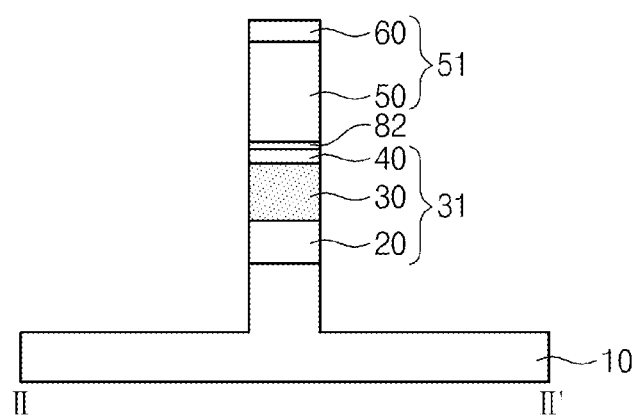

FIG. 11 is a perspective view illustrating a spot size converter 100 according to another embodiment of the present invention. FIGS. 12A, 13A, and 14A are plan views illustrating a method of manufacturing the spot size converter 100 of FIG. 11. FIGS. 12B, 13B, and 14B are cross-sectional views taken along line I-I' of FIGS. 12A, 13A, and 14A, respectively. FIGS. 12C, 13C, and 14C are cross-sectional views taken along line II-II' of FIGS. 12A, 13A, and 14A, respectively.

Referring to FIGS. 11 and 14B, the spot size converter 100 may include: a buffer layer 80 disposed on a side of a substrate 10; and an etch stop layer 82 disposed between the buffer layer 80 and a waveguide layer 50. The buffer layer 80 may be disposed between a lower clad layer 20 and the etch stop layer 82. The etch stop layer 82 may be disposed between a first upper clad layer 40 and the waveguide layer 50. Also, the etch stop layer 82 may be disposed between the buffer layer 80 and the waveguide layer 50. The core layer 30 may be isolated from the waveguide layer 50 by the buffer layer 80 and the etch stop layer 82. Thus, the etch stop layer 82 can form the waveguide layer 50 as a shallow ridge type waveguide layer. The waveguide layer 50 can be extended in a simple flat structure from the side of the substrate 10 to another side thereof by means of the buffer layer 80 and the etch stop layer 82. The core layer 30 and the waveguide layer 50 may have a simple stacked structure by means of the buffer layer 80 and the etch stop layer 82

Thus, the productivity of the spot size converter 100 according to the current embodiment can be maximized.

A method of manufacturing the spot size converter 100 according to the current embodiment will now be described.

Referring to FIGS. 7A to 8C, the lower clad layer 20, the core layer 30, and the first upper clad layer 40 are formed on the substrate 10, and are tapered through patterning on the first side of the substrate 10.

Referring to FIGS. 12A to 12C, the buffer layer 80 is formed on side walls of the lower clad layer 20, the core layer 30, and the first upper clad layer 40. The buffer layer 80 may include InP. The buffer layer 80 may be planarized with the same level as that of the first upper clad layer 40.

Referring to FIGS. 13A to 13C, the etch stop layer 82, the waveguide layer 50, and the second upper clad layer 60 are formed on the first upper clad layer 40 and the buffer layer 80. The etch stop layer 82 may include InGaAsP through a process such as molecular beam epitaxy (MBE) or metal organic chemical vapor deposition (MOCVD).

Referring to FIGS. 14A to 14C, the waveguide layer 50 is wider than the core layer 30 on the first side of the substrate 10, and the waveguide layer 50 and the core layer 30 have the same width on the second side of the substrate 10. To this end, a region from the second upper clad layer 60 to the lower clad layer 20 is etched. The region from the second upper clad layer 60 to the lower clad layer 20 may be patterned through a photolithography process and an etching process. When the lower clad layer 20 is etched, the top surface of the substrate 10 may be removed.

Referring again to FIG. 11, the planarization layer 70 is formed on the substrate 10. The planarization layer 70 may cover side walls of the core layer 30 of the first waveguide 31 and side walls of the waveguide layer 50 of the second waveguide 51. The core layer 30 and the waveguide layer 50 can be efficiently formed through respective growth processes, respective photolithography processes, and respective etching process.

As a result, the method of manufacturing the spot size converter 100 according to the current embodiment can maximize the productivity of the spot size converter 100.

As described above, according to the embodiments, a core layer 30 may be tapered in a first direction on a side of a substrate 10. A waveguide layer 50 may be tapered in a second direction on the core layer 30 on the side of the substrate 10, and may extend with the same width as that of the core layer 30 on another side of the substrate 10. The core layer 30 and the waveguide layer 50 may have a deep ridge structure on the first side of the substrate 10. Thus, unlike a typical structure that performs a mode conversion through mode transfer or coupling, a spot size converter 100 according to the embodiments performs a mode conversion at the same core layer 30. Hence, the yield rate of devices is increased, and thus, the productivity thereof is maximized.

The above-disclosed subject matter is to be considered illustrative, and not restrictive, and the appended claims are intended to cover all such modifications, enhancements, and other embodiments, which fall within the true spirit and scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A method of manufacturing a spot size converter, comprising:
    stacking a lower clad layer, a core layer, and a first upper clad layer on a substrate;
    tapering the first upper clad layer and the core layer in a first direction on a side of the substrate;
    forming a waveguide layer on the first upper clad layer and the lower clad layer; and
    etching the waveguide layer, the first upper clad layer, the core layer, and the lower clad layer such that the waveguide layer is wider than a tapered portion of the core layer on the side of the substrate and has the same width as that of the core layer on another side of the substrate.

2. The method of claim 1, wherein the waveguide layer is tapered on the first side of the substrate in a second direction opposite to the first direction.

3. The method of claim 1, further comprising forming a buffer layer on the lower clad layer after the core layer and the first upper clad layer are formed,
    wherein the buffer layer is formed of the same material as that of the first upper clad layer.

4. The method of claim 3, further comprising forming an etch stop layer on the buffer layer and the first upper clad layer.

5. The method of claim 1, further comprising forming a second upper clad layer on the waveguide layer.

6. The method of claim 1, further comprising forming a planarization layer on side walls of the waveguide layer, the first upper clad layer, the core layer, and the lower clad layer.

7. A spot size converter comprising:
   a substrate;
   a first waveguide comprising a core layer that is tapered in a first direction on a first side of the substrate, the core layer being extended with a uniform width on a second side of the substrate, the first waveguide further comprising a lower clad layer disposed under the core layer; and
   a second waveguide comprising a waveguide layer that covers the first waveguide on the first side of the substrate, the waveguide layer being tapered and extended in a second direction opposite to the first direction, the waveguide layer having the same width of that of the core layer on the second side of the substrate,
   wherein a side wall of the waveguide layer on the first side of the substrate is flush with a side wall of the lower clad layer on the first side of the substrate.

8. The spot size converter of claim 7, wherein the first waveguide further comprises a first upper clad layer disposed over the core layer.

9. The spot size converter of claim 8, further comprising a buffer layer disposed on the lower clad layer and side walls of the first upper clad layer and the core layer, at the first side of the substrate.

10. The spot size converter of claim 9, further comprising an etch stop layer disposed on the buffer layer and the first upper clad layer.

11. The spot size converter of claim 7, wherein the second waveguide further comprises a second upper clad layer disposed on the waveguide layer.

12. The spot size converter of claim 7, wherein the waveguide layer, on the first side of the substrate, has a width same as that of the lower clad layer and greater than that of the core layer.

13. The spot size converter of claim 12, further comprising a planarization layer covering the side walls of the waveguide layer and the lower clad layer on the first side of the substrate.

* * * * *